(12) United States Patent
Clerc et al.

(10) Patent No.: US 7,503,168 B2
(45) Date of Patent: Mar. 17, 2009

(54) APPARATUS, SYSTEM, AND METHOD FOR PARTICULATE FILTER REGENERATION (75) Inventors: James C. Clerc, Columbus, IN (US); Bruce A. Watson, Columbus, IN (US)

(73) Assignee: Cumming Filtration IP, Inc, Minneapolis, MN (US)

( * ) Notice: Subject to any disclaimer, the term of this patent is extended or adjusted under 35 U.S.C. 154(b) by 85 days.

(21) Appl. No.: 11/389,001

(22) Filed: Mar. 24, 2006

(65) Prior Publication Data
US 2007/0220867 A1    Sep. 27, 2007

(51) Int. Cl.
*F01N 3/00* (2006.01)
(52) U.S. Cl. .............................. 60/295; 60/274; 60/286; 60/288; 60/291; 60/292; 60/297; 60/303
(58) Field of Classification Search .................. 60/274, 60/286, 287, 288, 291, 292, 295, 297, 303, 60/311
See application file for complete search history.

(56) References Cited

U.S. PATENT DOCUMENTS

| | | | | |
|---|---|---|---|---|
| 4,512,147 A | * | 4/1985 | Wong | ........................... 60/274 |
| 4,520,624 A | * | 6/1985 | Kiyota et al. | .................. 60/286 |
| 4,677,823 A | * | 7/1987 | Hardy | ........................... 60/274 |
| 4,987,738 A | * | 1/1991 | Lopez-Crevillen et al. | ..... 60/286 |
| 5,052,178 A | * | 10/1991 | Clerc et al. | .................... 60/274 |
| 6,375,695 B2 | * | 4/2002 | Machida et al. | ............. 55/282.3 |

* cited by examiner

*Primary Examiner*—Binh Q Tran
(74) *Attorney, Agent, or Firm*—Kunzler & McKenzie (57) ABSTRACT An apparatus, system, and method are disclosed for particulate filter regeneration. The apparatus includes a bypass exhaust channel configured to conduct exhaust gasses away from a main exhaust channel and reintroduce the exhaust gasses into the main exhaust channel upstream from a particulate filter, a burner, and a regeneration module configured to monitor exhaust gas variables and divert a portion of the exhaust gasses through the bypass exhaust channel in response to the exhaust gas variables. The system includes a vehicle having an internal combustion engine coupled to a transmission, and the apparatus. The method includes conducting exhaust gasses away from a main exhaust channel and reintroducing the exhaust gasses into the main exhaust channel, raising the temperature of the exhaust gasses, and monitoring exhaust gas variables and selectively diverting a portion of the exhaust gasses through a bypass exhaust channel in response to the exhaust gas variables.

25 Claims, 7 Drawing Sheets

APPARATUS, SYSTEM, AND METHOD FOR PARTICULATE FILTER REGENERATION

BACKGROUND OF THE INVENTION

1. Field of the Invention

This invention relates to particulate filter systems and more particularly relates to particulate filter regeneration.

2. Description of the Related Art

Particulate emission standards set by the Environmental Protection Agency (EPA) require all urban buses and heavy duty trucks to emit less than 0.1 gm/hp-hr of particulate matter. Particulates are defined by EPA as any matter in the exhaust of an internal combustion engine, other than condensed water, which is capable of being collected by a standard filter after dilution with ambient air at a temperature of 125° F. Included in this definition are, agglomerated carbon particles, absorbed hydrocarbons, including known carcinogens, and sulfates.

These particulates are very small in size, with a mass median diameter of 0.5-1 micro meters, and are of very low bulk density. During the life of the typical vehicle, approximately 20 cubic feet of particulate matter which must be trapped will be emitted per 100,000 miles of engine operation. This amounts to approximately 100 lbs. of particulate matter or more depending upon the type of vehicle. Obviously this particulate matter cannot be stored within the vehicle because one pound of particulate occupies a volume of approximately 350 cubic inches. Therefore, there is a need for a filtration system which will both efficiently and reliably remove these particulates from the exhaust emission of these vehicles One such solution is an electrical heater and a catalyst bed. During normal driving conditions, exhaust gas from an internal combustion engine flows through an outer passage and continues through a filter positioned at the end of the system, where a portion of the particulate matter within the exhaust is trapped and the remainder is emitted to the atmosphere. When the system senses that a sufficient amount of particulates have been collected, a portion of the exhaust gas stream is directed to flow through an inner flow passage and through an electrical heater and a catalyst bed. The catalyst bed is provided with an aspirating device which mixes fuel with the exhaust flow to raise the temperature of the catalyst bed to approximately 1200° F. This temperature is sufficient to cause the carbon particulates retained in the filter to begin burning. Upon completion of this burning cycle the exhaust is again routed through the outer passage. It should be noted, that the excess exhaust flow during the burning cycle is vented directly to the atmosphere. By positioning the catalyst bed between the filter to be regenerated and the fuel supply, the catalyst bed is directly subjected to the aspirated fuel as well as extremely high temperatures. This can result in inhibiting formations of sulfates as well as the possible burn out of the catalyst which will lead to expensive repair or require replacement of the entire system.

Another solution is to position a catalyst upstream of a particulate trap and directly subject the catalyst to aspirated fuel. This fuel is combined with a portion of the exhaust and expended through the catalyst and raised to a temperature of 600° C. This heated mixture is then directed through the particulate trap in order to oxidize the particulate matter retained therein. Again, by subjecting the catalyst to the aspirated fuel as well as the high temperatures, unwanted sulfates may form thereon resulting as well as possible burn out of the catalyst.

A further attempt in capturing emitted particulates within a particulate trap and system for regenerating the particulate trap includes a particulate trap positioned within an exhaust stream, downstream of a diesel fuel burner used for the purpose of regenerating the particulate trap. During normal operation engine exhaust is routed through the particulate trap to a muffler located downstream thereof, and then expended to the atmosphere. Once a sufficient pressure build up is sensed by the control system, the regeneration cycle will commence. At this time the exhaust gas is directed through the by-pass conduit, through the muffler and expelled to the atmosphere. Diesel fuel is aspirated within the diesel fuel burner to form a fuel-air mixture which is ignited by a spark plug in response to the condition sensed by the control system. The burning mixture is maintained at a temperature between 1200° F. and 1400° F. so as to properly oxidize the particles retained in the trap. The mixture and the particulates dislodge from the trap and are then also expelled to the atmosphere In doing so, these particles along with the exhaust gas expelled during the regeneration cycle are emitted directly into the atmosphere Without any further treatment. These untreated emissions may result in detectable particulates in excess of EPA standards.

As is clear from the above, there is a pressing need for an exhaust particulate trap and regeneration system which will both significantly and reliably reduce the amount of emitted particulate from diesel engine exhaust.

SUMMARY OF THE INVENTION

The present invention has been developed in response to the present state of the art, and in particular, in response to the problems and needs in the art that have not yet been fully solved by currently available particulate filter regeneration systems. Accordingly, the present invention has been developed to provide an apparatus, system, and method for particulate filter regeneration that overcome many or all of the above-discussed shortcomings in the art.

The apparatus to regenerate particulate filters is provided with a logic unit containing a plurality of modules configured to functionally execute the necessary steps of particulate filter regeneration. These modules in the described embodiments include a main exhaust channel configured to conduct exhaust gasses away from an engine, and a bypass exhaust channel coupled to the main exhaust channel configured to conduct exhaust gasses away from the main exhaust channel and subsequently reintroduce the exhaust gasses into the main exhaust channel before the exhaust gasses flow through a particulate filter.

The apparatus may also include a burner coupled to an interior surface of the bypass exhaust channel configured to ignite the exhaust gasses and raise the temperature of the exhaust gasses, and wherein the particulate filter integral to the main exhaust channel and positioned downstream from the bypass exhaust channel. In one embodiment, the apparatus includes a regeneration module configured to monitor a plurality of exhaust gas variables and selectively divert a portion of the exhaust gasses through the bypass exhaust channel in response to the plurality of exhaust gas variables.

In a further embodiment, the apparatus further comprises a valve in communication with the regeneration module and configured to direct a portion of the exhaust gasses through the bypass exhaust channel in response to a command from the regeneration module. The regeneration module may be configured to command the valve to direct exhaust gasses in the range of between about 5 and 25 percent through the bypass exhaust channel.

The burner may be configured to raise the temperature of the exhaust gasses to a predetermined temperature, and the difference between an initial temperature of the exhaust gasses and a post-burner temperature is in the range of between about 100 and 400 degrees Celsius. In one embodiment, the apparatus includes an injector configured to inject unignited fuel into the bypass exhaust chamber. In a further embodiment, the exhaust gas variables is chosen from a group consisting of temperature, pressure, oxygen content, nitrogen oxide content, and flow.

A system of the present invention is also presented to regenerate particulate filters. In particular, the system, in one embodiment, includes a vehicle having an internal combustion engine coupled to a transmission, a main exhaust channel configured to conduct exhaust gasses away from the internal combustion engine, and a bypass exhaust channel coupled to the main exhaust channel configured to conduct exhaust gasses away from the main exhaust channel and subsequently reintroduce the exhaust gasses into the main exhaust channel.

The system also includes a burner coupled to an interior surface of the bypass exhaust channel configured to ignite the exhaust gasses and subsequently raise the temperature of the exhaust gasses, and a particulate filter integral to the main exhaust channel and positioned downstream from the bypass exhaust channel, the particulate filter configured to remove particulates from the exhaust gasses. In a further embodiment, the system includes a regeneration module configured to monitor a plurality of exhaust gas variables and selectively divert a portion of the exhaust gasses through the bypass exhaust channel in response to the plurality of exhaust gas variables.

A method of the present invention is also presented for particulate filter regeneration. The method in the disclosed embodiments substantially includes the steps necessary to carry out the functions presented above with respect to the operation of the described apparatus and system. In one embodiment, the method includes conducting exhaust gasses away from an internal combustion engine, conducting exhaust gasses away from a main exhaust channel and subsequently reintroducing the exhaust gasses into the main exhaust channel.

The method may also include igniting the exhaust gasses, subsequently raising the temperature of the exhaust gasses, removing particulates from the exhaust gasses, and monitoring a plurality of exhaust gas variables and selectively diverting a portion of the exhaust gasses through a bypass exhaust channel in response to the plurality of exhaust gas variables.

In a further embodiment, the method includes directing a portion of the exhaust gasses through the bypass exhaust channel in response to a command from a regeneration module. The method may also include raising the temperature of the exhaust gasses to a predetermined temperature, and injecting unignited fuel into the bypass exhaust chamber.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
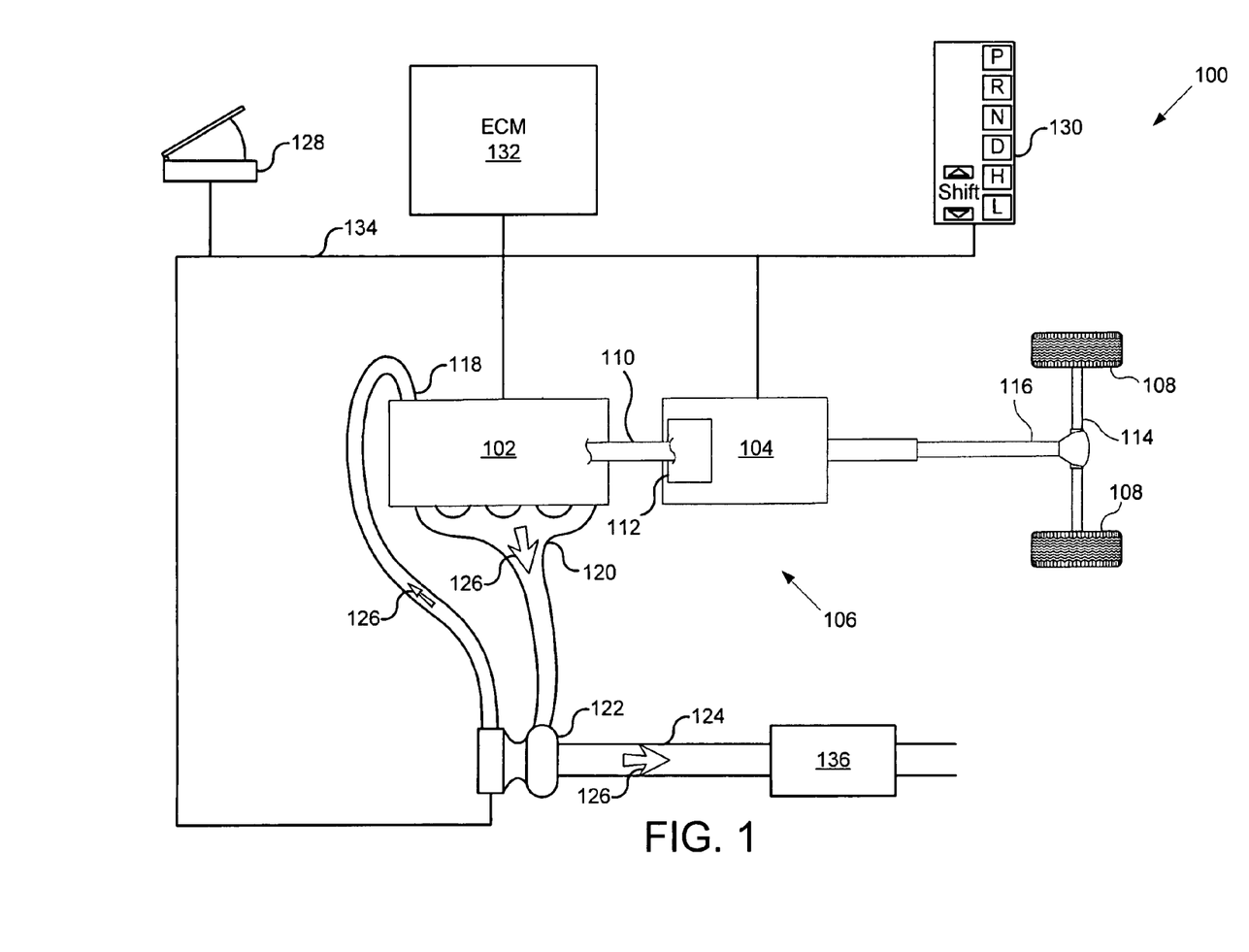
FIG. 1 is a schematic block diagram illustrating one embodiment of a vehicle having a particulate filter regeneration system.

FIG. 1 is a schematic block diagram illustrating one embodiment of a system for particulate filter regeneration. In one embodiment, the system comprises a vehicle 100. The vehicle 100 may be an automobile, truck, bus, or other type of internal combustion powered vehicle. The vehicle 100 may comprise an internal combustion engine 102 coupled to a transmission 104. The internal combustion engine 102 (hereinafter "engine 102") may be of the four stroke diesel-fueled type with Compression Ignition (CI). Alternatively, the engine 102 may be a different type of engine such as, but not limited to, two stroke diesel-fueled types, a Spark Ignition (SI) type of engine, or a gaseous or gasoline fueled type. The engine 102 together with the transmission 104 is commonly referred to as a "drivetrain."

In one embodiment, the drivetrain 106 further comprises a pair of rotating propulsion members in the form of ground engaging wheels 108. An output shaft 110 of the engine 102 couples the engine 102 to a torque converter 112 of the transmission 104. The transmission may comprise a manual, automatic, or automated manual transmission.

A propeller shaft 114 is rotatably coupled to a drive shaft 116 of the transmission 104 and transfers torque from the engine 102 to the wheels 108 in order to propel the vehicle. The present description of the drivetrain 106 is directed to the primary components of the drivetrain 106 with standard components not being specifically described as the standard components would be known to those skilled in the art.

The engine 102, in one embodiment, includes an intake manifold 118, an exhaust manifold 120, a turbocharger 122, and an exhaust system 124. Exhaust and combustion gasses generally flow in the directions indicated by arrows 126. As is well known to those skilled in the art, exhaust gasses are exhausted from the engine 112 into the exhaust manifold 120, and pushed through the turbocharger 122 to the exhaust system 124. The turbocharger 122 utilizes the flow of exhaust gasses to accelerate the flow of combustion gasses through the intake manifold 118 to subsequently increase the performance of the engine 112. Alternatively, the vehicle 100 may not implement a turbocharger 122.

A driver utilizes a throttle 128, a gear selection module 130, and a plurality of input devices (not shown), such as a steering wheel, while driving the vehicle 100. In one embodiment, an engine control module (ECM) 132 is configured to receive control data from the plurality of input devices, throttle 128, and gear selection module 130. The ECM 132 may also be configured to interpret the data and send command signals to the engine 132. One skilled in the art will recognize that the ECM 132 is also capable of commanding a plurality of systems, such as a fueling system.

In one embodiment, the ECM 132 is configured to communicate with the various systems of the vehicle 100 over a data network 134. The data network 134 may be a common data path over which the throttle 128 and gear selection module 130 transmit commands. Additionally, the data network 134 may comprise a unique wired or wireless connection between each of the plurality of devices 128, 130, and 132. Alternatively, each device 128, 130, and 132 may have a separate connection to each of the other devices.

The vehicle 100 may also include a unitary housing 136 coupled to the exhaust system 124 and located downstream from the turbocharger 122. As used herein, the term "downstream" refers to in the direction of or a location nearer to an exhaust outlet such as a tailpipe (not shown). In one embodiment, the unitary housing 136 may comprise a particulate trap system for reducing particulate emissions from the engine 102.

Figure 2:
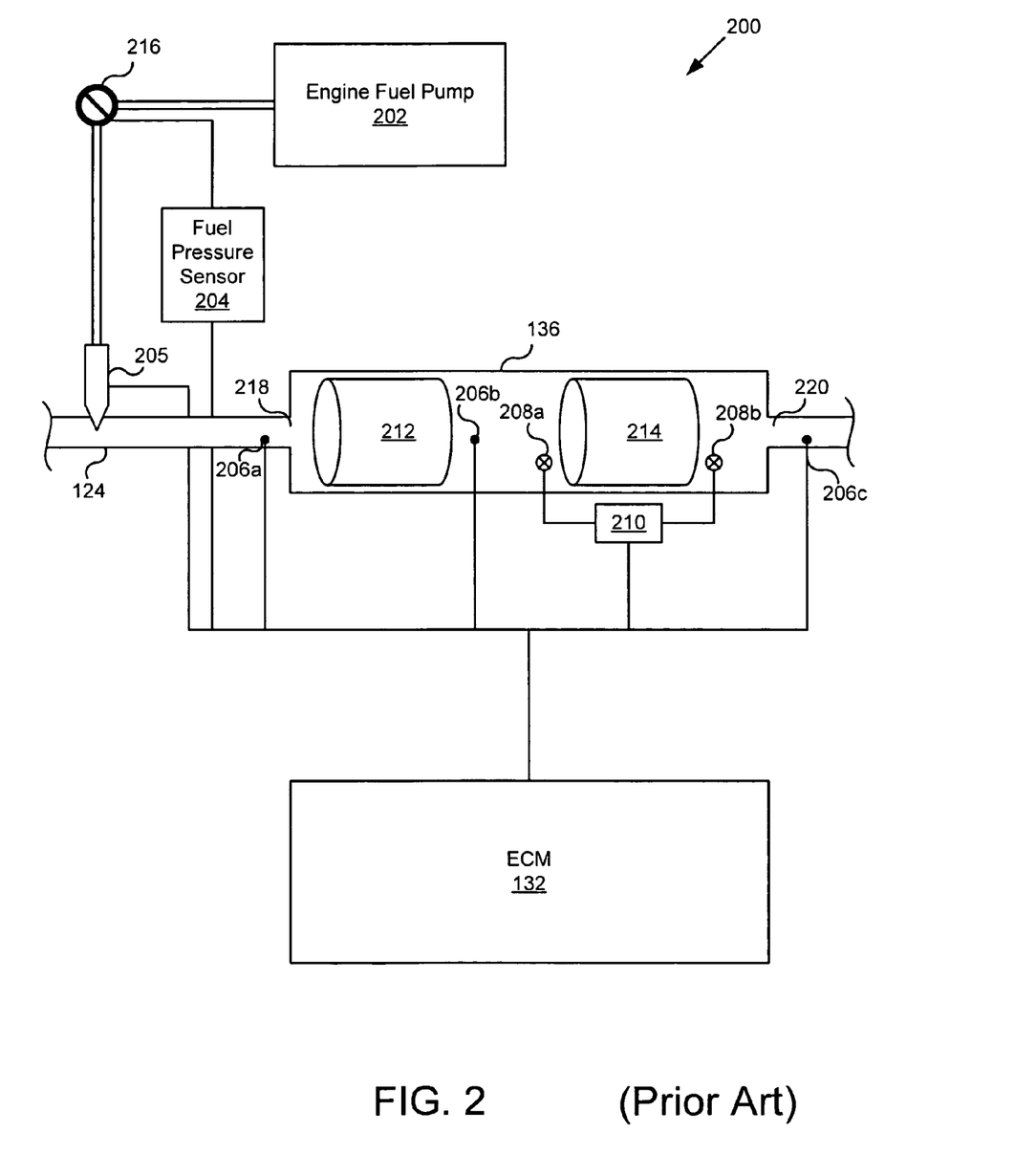
FIG. 2 is a schematic block diagram illustrating one embodiment of a system for particulate filter regeneration in accordance with the prior art.

FIG. 2 is a schematic block diagram illustrating one embodiment of a system 200 for particulate filter regeneration in accordance with the prior art. In one embodiment, the system 200 comprises the ECM 132, the unitary housing (hereinafter "housing") 136, a fuel pump 202, a fuel pressure sensor 204, a fuel injector 205, a plurality of temperature sensors 206, a plurality of pressure sensors 208, and a pressure module 210. Furthermore, the housing 136 may include an oxidation catalyst 212 and a catalyzed soot filter or particulate filter 214.

In one embodiment, the fuel pump 202 may be an in-tank fuel pump (not shown) that pumps fuel from a fuel tank. Fuel pump speed, and therefore fuel flow, may vary according to commands sent from the ECM 132. Another delivery device such as a solenoid may be used for constant pressure fuel delivery. The fuel pressure sensor 204 may be configured to communicate fuel pressure information with the ECM 132. In a further embodiment, the system 200 may also include a fuel shut-off valve 216 positioned in a fuel line 218 between the fuel pump 202 and the fuel injector 205. Furthermore, the fuel pressure sensor 204 may be in communication with the fuel shut-off valve 216 and configured to open and close the fuel shut-off valve 216.

In the depicted embodiment, a first temperature sensor 206a is located just upstream from an inlet 218, a second temperature sensor 206b located just downstream from the oxidation catalyst 212, and a third temperature sensor 206c located just downstream from an outlet 220. For simplicity, the first, second, and third temperature sensors 206a, 206b, 206c may be referred to jointly as "the plurality of temperature sensors 206."

In a further embodiment, a first pressure sensor 208a is located just upstream of the particulate filter 214, and a second pressure sensor 208b is located just downstream from the particulate filter 214. For simplicity, the first and second pressure sensors 208a, 208b may be referred to jointly as "the plurality of pressure sensors 208." The pressure module 210 may couple the plurality of pressure sensors 208, and be configured to continuously monitor the plurality of pressure sensors 208. Subsequently, the pressure module 210 may communicate pressure information with the ECM 132.

The oxidation catalyst 212 may comprise a precious metal oxidation catalyst on a flow through metal or ceramic substrate for oxidizing unburned hydrocarbons, however, operability of the system 200 does not depend on this particular type of oxidation catalyst. The particulate filter 214 may comprise an uncatalyzed wall flow monolith type or uncatalyzed ceramic foam type. Both the wall flow monolith and the ceramic foam adequately capture the carbon particulates in the exhaust gas flow.

The system 200 is configured to route all exhaust gasses through the oxidation catalyst 212 and the particulate filter 214 in order to control emissions. Composition of the exhaust gasses may be controlled by the ECM 132. The ECM 132 adjusts the composition of the exhaust gasses by in-cylinder engine control and addition of fuel to the exhaust through the fuel injector 205.

Figure 3:
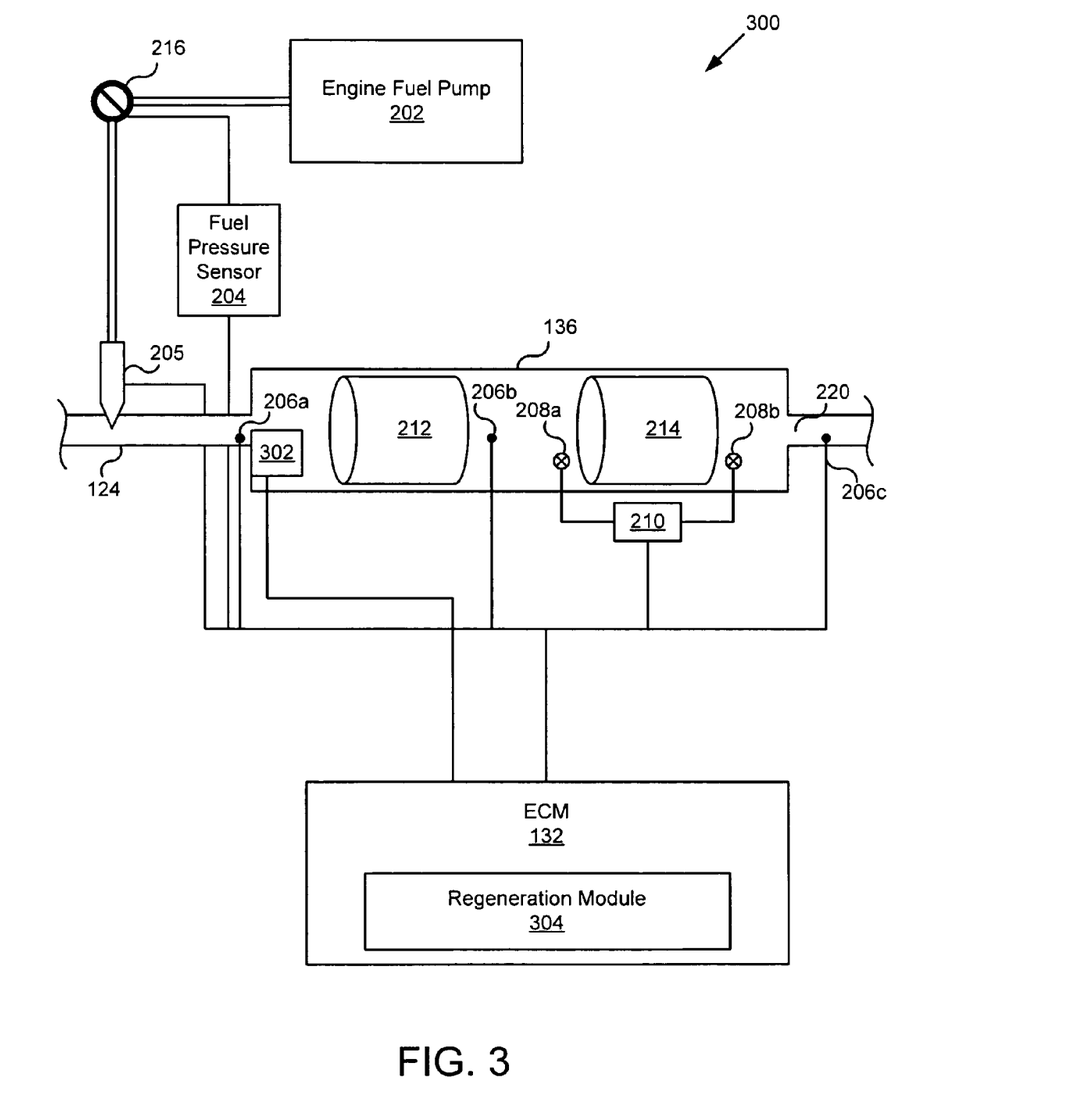
FIG. 3 is a schematic block diagram illustrating one embodiment of a system for particulate filter regeneration in accordance with the present invention.

FIG. 3 is a schematic block diagram illustrating one embodiment of a system 300 for particulate filter regeneration in accordance with the present invention. The system 300 may comprise an electrically heated catalyst 302. The electrically heated catalyst 302 is configured to oxidize a combustible fuel which may be injected by the fuel injector 205. Electric current passing through the electrically heated catalyst 302 heats the electrically heated catalyst 302. This heat causes a catalytic oxidative combustion of the fuel and exhaust gas mixture. In a further embodiment, the electrically heated catalyst 302 is configured to heat exhaust gasses without the use of injected fuel.

In one embodiment, the ECM 132 comprises a regeneration module 304. The regeneration module 304 may be configured to monitor a plurality of exhaust gas variables and activate the electrically heated catalyst 302 in response to reaching predetermined thresholds. The exhaust gas variables may include, but are not limited to, exhaust temperature, exhaust pressure, oxygen content, nitrogen oxide content, and exhaust flow. The electrically heated catalyst 302 elevates the exhaust temperature to levels that incinerate particulates trapped in the particulate filter 214. In this way, the particulate filter 214 is regenerated.

Figure 4:
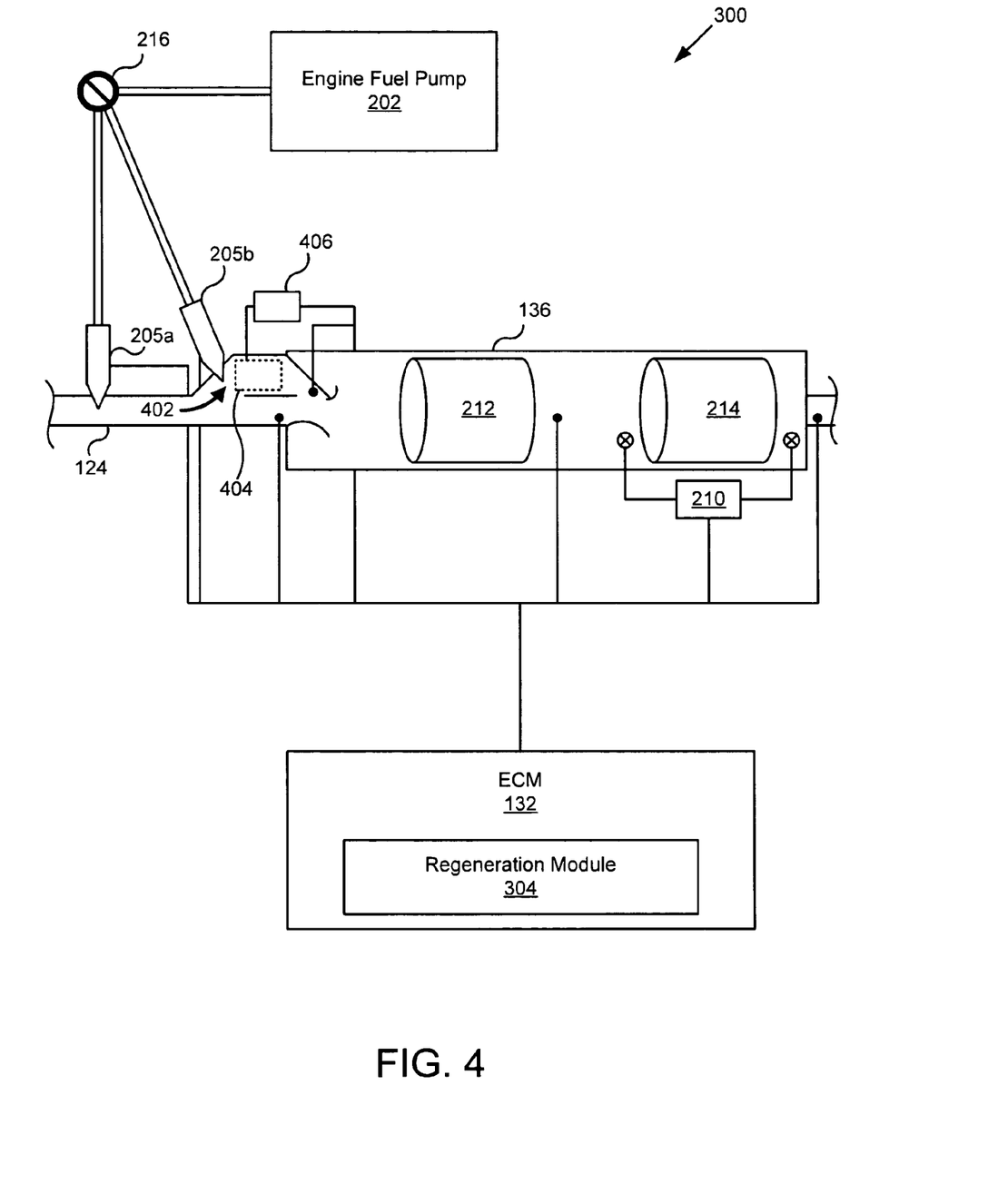
FIG. 4 is a schematic block diagram illustrating one embodiment of a system for particulate filter regeneration in accordance with the present invention.

FIG. 4 is a schematic block diagram illustrating one embodiment of a system 300 for particulate filter regeneration in accordance with the present invention. The system 300 may comprise a bypass channel 402 coupled to the exhaust system 124 (hereinafter referred to as the "main exhaust channel"). The bypass channel 402 is configured to conduct exhaust gasses away from the main exhaust channel 124 and subsequently reintroduce the exhaust gasses into the main exhaust channel before the exhaust gasses flow through the particulate filter 214.

In one embodiment, a burner 404 may be coupled to an interior surface of the bypass channel 402. The burner 404 is configured to ignite the exhaust gasses and raise the temperature of the exhaust gasses before the exhaust gasses are recombined with the exhaust gasses flowing through the main exhaust channel 124. The burner 404 may be coupled to an igniter module 406. The igniter module 406 is configured to communicate with the ECM 132 and respond to commands from the ECM 132. In a further embodiment, the burner 404 is a diesel fuel burner configured to ignite diesel fuel using unignited exhaust gasses as a source of oxygen without the need of an external oxygen source.

In the depicted embodiment, the system 300 comprises a plurality of fuel injectors 205. A first fuel injector 205a, also referred to as a "dosing injector," doses the entire stream of exhaust gasses. A second fuel injector 205b, also referred to as a "burner injector," allows finer temperature adjustments to the exhaust gas flow in the bypass channel 402. In one embodiment, the first and second fuel injectors 205a, 205b allow independent control of the exhaust composition and exhaust temperature in the downstream catalyst elements such as the oxidation catalyst 212. Additionally, this allows for a wider operating range of exhaust flow, exhaust temperature and oxygen content for particulate filter regeneration.

Figure 5:
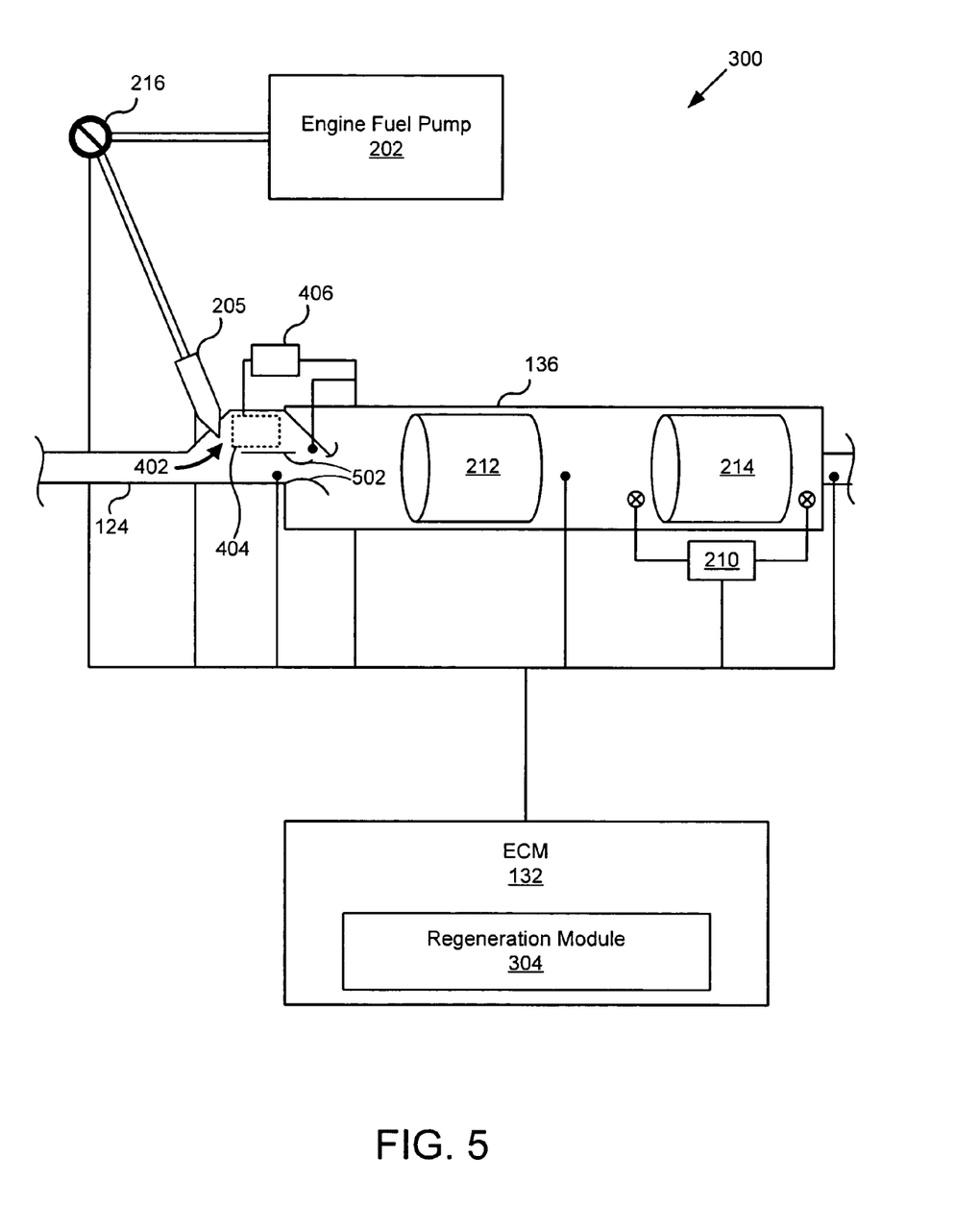
FIG. 5 is a schematic block diagram illustrating one embodiment of the system for particulate filter regeneration in accordance with the present invention.

FIG. 5 is a schematic block diagram illustrating one embodiment of the system 300 for particulate filter regeneration in accordance with the present invention. In one embodiment, the system 300 may comprise a single fuel injector 205 configured to inject fuel directly into the bypass channel 402. In a further embodiment, the system 300 comprises an exhaust gas mixing device for recombining exhaust gasses from the bypass channel 402 with exhaust gasses from the main exhaust channel 124.

In the depicted embodiment, the exhaust gas mixing device comprises a venturi device 502 in the main exhaust channel 124. The venturi device 502 comprises a tapered inlet for constricting exhaust gas flow. The exhaust gasses are accelerated through the venturi device 502 and subsequently exhaust gas pressure is lowered. The lower gas pressure has the effect of a vacuum and draws exhaust gasses from the bypass channel 402. This effectively mixes the exhaust gasses. Furthermore, the vacuum created by the venturi device 502 causes exhaust gasses to be drawn into the bypass channel 402. The venturi device 502 may be configured to draw gasses into the bypass channel 402 regardless of a need to raise the temperature of the exhaust gasses.

Figure 6:
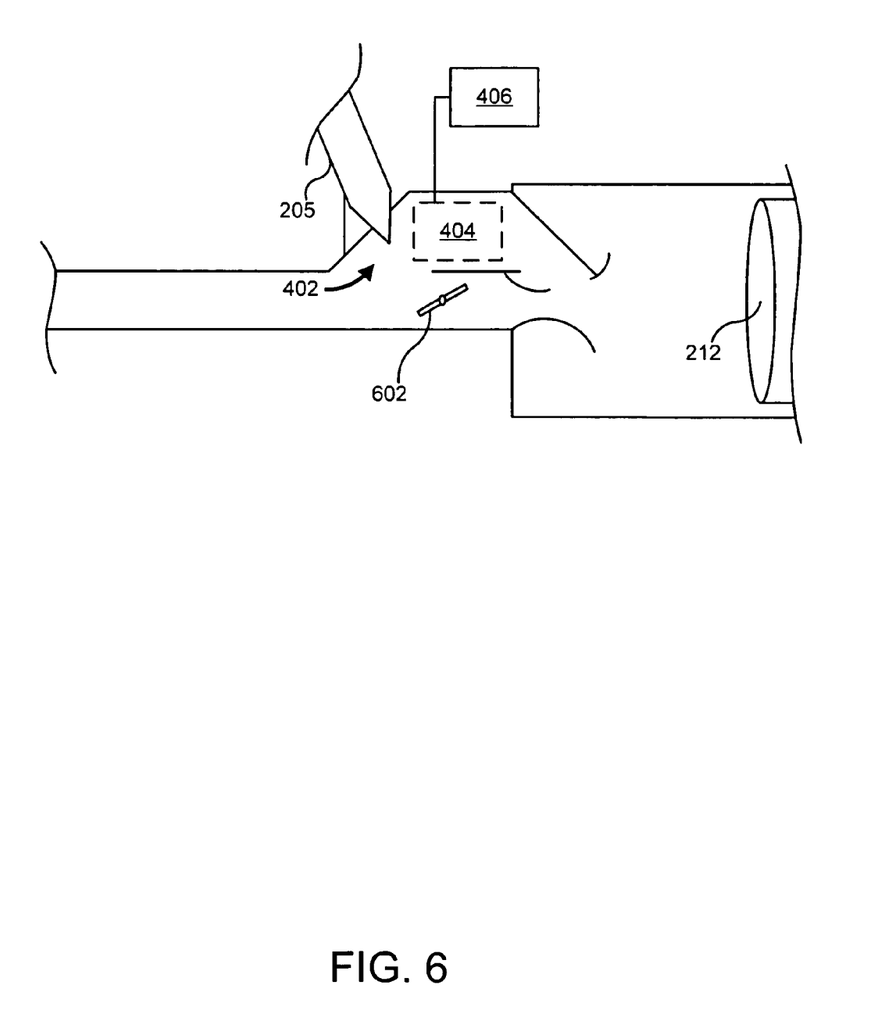
FIG. 6 is a schematic block diagram illustrating one embodiment of the system for particulate filter regeneration in accordance with the present invention.

FIG. 6 is a schematic block diagram illustrating one embodiment of the system 300 for particulate filter regeneration in accordance with the present invention. In one embodiment, the system 300 may comprise a valve 602 configured to direct a portion of exhaust gasses through the bypass exhaust channel 402 in response to a command from the regeneration module 304.

The valve 602 is adjustable from a fully open position configured to not restrict exhaust gasses to a fully closed position configured to direct substantially 100% of the exhaust gasses through the bypass exhaust channel 402. In the depicted embodiment, the valve 602 is configured to pivot about a central point. Alternatively, a passive mechanical valve/regulator may be placed in the bypass exhaust channel 402 and configured to regulate the amount of exhaust gas flow through the bypass exhaust channel 402.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
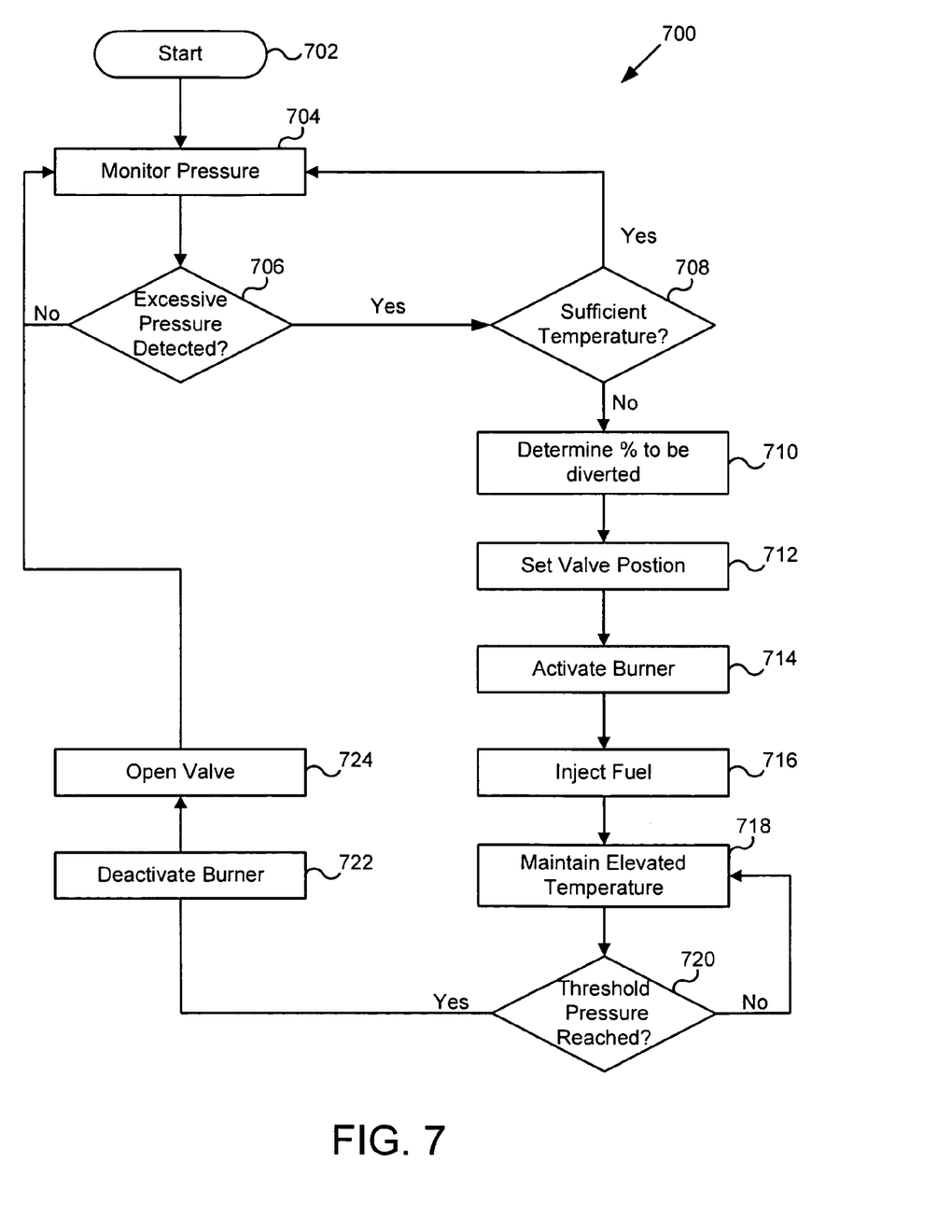
FIG. 7 is a schematic flow chart diagram illustrating one embodiment of a method 700 for particulate filter regeneration in accordance with the present invention.

FIG. 7 is a schematic flow chart diagram illustrating one embodiment of a method 700 for particulate filter regeneration in accordance with the present invention. The method 700 starts 702 and the regeneration module 304 monitors 704 the pressure differential across the catalyzed soot filter 214. In one embodiment, monitoring 704 the pressure differential across the catalyzed soot filter 214 comprises measuring the pressure at the pressure sensor 208a and measuring the pressure at the pressure sensor 208b and subsequently calculating the difference in pressure. A greater pressure at the pressure sensor 208a indicates a clogged catalyzes soot filter 136 that requires regeneration.

A predetermined threshold for excessive pressure across the catalyzed soot filter 214 may be set according to physical characteristics of the catalyzed soot filter 214 in combination with exhaust gas flow characteristics. Examples of exhaust gas flow characteristics may include, but are not limited to, engine displacement.

If the regeneration module 304 detects 706 excessive pressure, and if the regeneration detects sufficient temperature to regenerate the catalyzed soot filter, then the regeneration module continues monitoring 704 pressure. However, if the regeneration detects 708 insufficient temperatures at the plurality of temperature sensors 206 to burn the captured particulates, then the regeneration module will determine 710 the percentage of exhaust gas to be diverted through the bypass exhaust channel 402.

The regeneration module 304 may then set 712 the valve 602 position in order to divert the determined percentage of exhaust gasses through the bypass exhaust channel 402. In one embodiment, the regeneration module 304 then activates 714 the burner. Alternatively, the regeneration module 304 needs not set 712 the position of the valve 602, but rather allow the venturi device 502 to draw exhaust gasses through the bypass exhaust channel 402 as discussed above with reference to FIG. 5.

In a further embodiment, the regeneration module 304 may command the fuel pressure sensor 204 to inject 716 into the main exhaust channel 124, or alternatively, directly into the bypass exhaust channel 402. The regeneration then maintains 718 the activation of the burner and subsequently the elevated temperature while the exhaust gasses of the bypass exhaust channel 402 are recombined with the exhaust gasses of the main exhaust channel 124 and passed through the oxidation catalyst 212 and the catalyzed soot filter 214

The elevated temperature causes the clogged particulates to ignite, thereby regenerating the catalyzed soot filter 214 by removing the clogged particulates. The regeneration module 304 continues to monitor the differential pressure across the catalyzed soot filter 214, and once the differential pressure has reached 720 the threshold pressure, the regeneration module 304 deactivates 722 the burner. In a further embodiment, the regeneration module then opens 724 the valve and continues monitoring 704 the pressure while the vehicle 100 is operating.

The present invention may be embodied in other specific forms without departing from its spirit or essential character-istics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to regenerate a particulate filter, the apparatus comprising:
    a main exhaust channel configured to conduct exhaust gasses away from an engine;
    a bypass exhaust channel coupled to the main exhaust channel configured to conduct exhaust gasses away from the main exhaust channel and subsequently reintroduce the exhaust gasses into the main exhaust channel before the exhaust gasses flow through a particulate filter;
    a burner coupled to an interior surface of the bypass exhaust channel configured to ignite the exhaust gasses and raise the temperature of the exhaust gasses;
    the particulate filter integral to the main exhaust channel and positioned downstream from the bypass exhaust channel, the particulate filter configured to remove particulates from the exhaust gasses; and
    a regeneration module configured to monitor a plurality of exhaust gas variables, detect at least one level among the exhaust gas variables, determine a percentage of the exhaust gasses to be diverted, and selectively divert a portion of the exhaust gasses through the bypass exhaust channel in response to the level detected among the plurality of exhaust gas variables and the percentage that is determined.

2. The apparatus of claim 1, further comprising a valve in communication with the regeneration module and configured to direct a portion of the exhaust gasses through the bypass exhaust channel in response to a command from the regeneration module.

3. The apparatus of claim 2, wherein the regeneration module is configured to command the valve to direct exhaust gasses in the range of between about 5 and 25 percent through the bypass exhaust channel.

4. The apparatus of claim 1, wherein the burner is configured to raise the temperature of the exhaust gasses to a predetermined temperature, and the difference between an initial temperature of the exhaust gasses and a post-burner temperature is in the range of between about 100 and 400 degrees Celsius.

5. The apparatus of claim 4, wherein the difference between the initial temperature of the exhaust gasses and the post-burner temperature is about 200 degrees Celsius.

6. The apparatus of claim 4, further comprising an injector configured to inject unignited fuel into the bypass exhaust chamber.

7. The apparatus of claim 1, wherein the plurality of exhaust gas variables is chosen from a group consisting of temperature, pressure, oxygen content, nitrogen oxide content, and flow.

8. A system to regenerate a particulate filter, the system comprising:
    a vehicle having an internal combustion engine coupled to a transmission;
    a main exhaust channel configured to conduct exhaust gasses away from the internal combustion engine;
    a bypass exhaust channel coupled to the main exhaust channel configured to conduct exhaust gasses away from the main exhaust channel and subsequently reintroduce the exhaust gasses into the main exhaust channel;

a burner coupled to an interior surface of the bypass exhaust channel configured to ignite the exhaust gasses and subsequently raise the temperature of the exhaust gasses;

a particulate filter integral to the main exhaust channel and positioned downstream from the bypass exhaust channel, the particulate filter configured to remove particulates from the exhaust gasses; and a regeneration module configured to monitor a plurality of exhaust gas variables, detect at least one level among the exhaust gas variables, determine a percentage of the exhaust gasses to be diverted, and selectively divert a portion of the exhaust gasses through the bypass exhaust channel in response to the level detected among the plurality of exhaust gas variables and the percentage that is determined.

9. The system of claim 8, further comprising a valve in communication with the regeneration module and configured to direct a portion of the exhaust gasses through the bypass exhaust channel in response to a command from the regeneration module.

10. The system of claim 9, wherein the regeneration module is configured to command the valve to direct exhaust gasses in the range of between about 5 and 25 percent through the bypass exhaust channel.

11. The system of claim 8, wherein the burner is configured to raise the temperature of the exhaust gasses to a predetermined temperature, and the difference between an initial temperature of the exhaust gasses and a post-burner temperature is in the range of between about 100 and 400 degrees Celsius.

12. The system of claim 11, wherein the difference between the initial temperature of the exhaust gasses and the post-burner temperature is about 200 degrees Celsius.

13. The system of claim 11, further comprising an injector configured to inject unignited fuel into the bypass exhaust chamber.

14. The system of claim 8, wherein the plurality of exhaust gas variables is chosen from a group consisting of temperature, pressure, oxygen content, nitrogen oxide content, and flow.

15. A signal bearing medium tangibly embodying a program of machine-readable instructions executable by a digital processing apparatus to perform an operation to regenerate a particulate filter, the operation comprising:

conducting exhaust gasses away from an internal combustion engine;

conducting exhaust gasses away from a main exhaust channel and subsequently reintroducing the exhaust gasses into the main exhaust channel;

igniting the exhaust gasses and subsequently raising the temperature of the exhaust gasses;

removing particulates from the exhaust gasses;

monitoring a plurality of exhaust gas variables;

detecting at least one level among the exhaust gas variables;

determining a percentage of the exhaust gasses to be diverted; and selectively diverting a portion of the exhaust gasses through a bypass exhaust channel in response to the level detected among the plurality of exhaust gas variables and the percentage that is determined.

16. The signal bearing medium of claim 15, wherein the instructions further comprise an operation to direct a portion of the exhaust gasses through the bypass exhaust channel in response to a command from a regeneration module.

17. The signal bearing medium of claim 16, wherein the instructions further comprise an operation to direct exhaust gasses in the range of between about 5 and 25 percent through the bypass exhaust channel.

18. The signal bearing medium of claim 16, wherein the instructions further comprise an operation to raise the temperature of the exhaust gasses to a predetermined temperature, and the difference between an initial temperature of the exhaust gasses and a post-burner temperature is in the range of between about 100 and 400 degrees Celsius.

19. The signal bearing medium of claim 16, wherein the instructions further comprise an operation to inject unignited fuel into the bypass exhaust chamber.

20. A method for regenerating a particulate filter, the method comprising:

conducting exhaust gasses away from an internal combustion engine;

conducting exhaust gasses away from a main exhaust channel and subsequently reintroducing the exhaust gasses into the main exhaust channel;

igniting the exhaust gasses and subsequently raising the temperature of the exhaust gasses;

removing particulates from the exhaust gasses;

monitoring a plurality of exhaust gas variables;

detecting at least one level among the exhaust gas variables;

determining a percentage of the exhaust gasses to be diverted; and selectively diverting a portion of the exhaust gasses through a bypass exhaust channel in response to the level detected among the plurality of exhaust gas variables and the percentage that is determined.

21. The method of claim 20, further comprising directing a portion of the exhaust gasses through the bypass exhaust channel in response to a command from a regeneration module.

22. The method of claim 21, further comprising directing exhaust gasses in the range of between about 5 and 25 percent through the bypass exhaust channel.

23. The method of claim 21, further comprising raising the temperature of the exhaust gasses to a predetermined temperature, and the difference between an initial temperature of the exhaust gasses and a post-burner temperature is in the range of between about 100 and 400 degrees Celsius.

24. The method of claim 21, further comprising injecting unignited fuel into the bypass exhaust chamber.

25. An apparatus to regenerate a particulate filter, the apparatus comprising:

means for conducting exhaust gasses away from an internal combustion engine;

means for conducting exhaust gasses away from a main exhaust channel and subsequently reintroducing the exhaust gasses into the main exhaust channel;

means for igniting the exhaust gasses and subsequently raising the temperature of the exhaust gasses;

means for removing particulates from the exhaust gasses;

means for monitoring a plurality of exhaust gas variables;

means for detecting at least one level among the exhaust gas variables;

means for determining a percentage of the exhaust gasses to be diverted; and means for selectively diverting a portion of the exhaust gasses through a bypass exhaust channel in response to the level detected among the plurality of exhaust gas variables and the percentage that is determined.

* * * * *